Sept. 28, 1954  W. J. O'BRIEN ET AL  2,690,559
RADIO FREQUENCY NAVIGATION SYSTEM
WITH LANE IDENTIFICATION
Filed Oct. 7, 1949  7 Sheets-Sheet 2

INVENTORS
WILLIAM J. O'BRIEN
DONALD E. BRIDGES
DENNIS A. HENDLEY
MAURICE H. EASY
JOHN VICKERS
BY
Attorney Sept. 28, 1954

W. J. O'BRIEN ET AL
RADIO FREQUENCY NAVIGATION SYSTEM
WITH LANE IDENTIFICATION 2,690,559

Filed Oct. 7, 1949

INVENTORS
WILLIAM J. O'BRIEN, DONALD E. BRIDGES,
BY DENNIS A. HENDLEY, MAURICE H. EASY,
JOHN VICKERS,
Attorney Sept. 28, 1954     W. J. O'BRIEN ET AL     2,690,559
RADIO FREQUENCY NAVIGATION SYSTEM
WITH LANE IDENTIFICATION
Filed Oct. 7, 1949     7 Sheets-Sheet 7

INVENTORS
WILLIAM J. O'BRIEN, DONALD E. BRIDGES,
BY DENNIS A. HENDLEY, MAURICE H. EASY,
JOHN VICKERS,
Walter F. Huntley
Attorney

Patented Sept. 28, 1954

2,690,559

UNITED STATES PATENT OFFICE 2,690,559

RADIO FREQUENCY NAVIGATION SYSTEM WITH LANE IDENTIFICATION

William J. O'Brien, London, Donald E. Bridges, Southall, Dennis A. Hendley, London, Maurice H. Easy, Chelsfield, and John Vickers, Brentwood, England, assignors to The Decca Record Company, Limited, London, England, a corporation of Great Britain Application October 7, 1949, Serial No. 120,054

Claims priority, application Great Britain October 8, 1948

24 Claims. (Cl. 343—105)

This invention relates to radio navigational systems and in particular to systems in which synchronized signals of different but harmonically related frequencies are radiated from spaced transmitters so as to produce a field pattern of hyperbolic iso-phase lines.

Isophase radio frequency navigation systems of known types include a plurality of spaced transmitters which are operated simultaneously to radiate a plurality of signals of unlike frequencies comprising different harmonics of a given fundamental frequency. These signals are held in a fixed multiple phase relation to permit the location of a mobile receiver to be determined by measuring the phase relations among the signals at the location of the receiver.

In one well-known commercial system, there is employed a master transmitter which radiates the sixth harmonic of a given fundamental, and three slave transmitters (designated "red," "green," and "purple" for easy identification), phase locked to the master transmitter and radiating the eighth, ninth, and fifth harmonics respectively of said given fundamental frequency. The mobile receiver is arranged to receive simultaneously all four signals.

In the receiver frequency changing circuits are used to convert the master and red slave signals to equality at the 24th harmonic, and phase measuring and indicating apparatus is included for measuring the phase relation between the two 24th harmonic signals and indicating the location of the receiver with reference to the family of hyperbolic iso-phase lines defined by the master and red slave signals, such location data being termed the "red" coordinate. Similar phase measurements at the 18th and 30th harmonics for the master-green slave and master-purple slave provide on separate indicators additional location data in terms of "green" and "purple" coordinates.

In the system described, a considerable ambiguity is deliberately introduced in order to achieve great precision in the measurement and indication of the various red, green and purple coordinates, the mentioned ambiguity resulting from a wide separation (of the order of one hundred miles) of the transmitting stations. In circumnavigating the master station, each measured phase relations will each progress through a considerable number of complete cycles of phase change, each cycle embracing 360 electrical degrees. The sector-like geographical areas embraced by each of said full cycles of phase change are termed "lanes."

Thus, while the system described gives a precise indication of the location of the mobile receiver within a given lane, the indications are ambiguous in that the system does not indicate which one of the plurality of lanes embraces the unknown location.

In a co-pending application, Serial No. 673,951, filed June 3, 1946, entitled Area Identification System, now Patent No. 2,478,833, and assigned to the assignee of this application, there is disclosed a system for eliminating or reducing the aforementioned ambiguity by periodically altering the mode of transmitter operation to establish from time to time a coarse pattern and less ambiguous pattern. On the basis of this coarse and less ambiguous pattern, the location of the mobile receiver can be determined rather roughly but with sufficient precision to definitely identify which of the plurality of available lanes embraces the receiver location.

One such system disclosed in the aforementioned copending application provided for radiating a fifth and sixth harmonic simultaneously from the master station and at the same time simultaneously radiating from a slave station the eighth and ninth harmonics. The beat notes from the fifth and sixth harmonics provides a signal of fundamental frequency which is compared in phase with the beat note of fundamental frequency derived from the eighth and ninth harmonics. Such a pattern is 24 times as coarse as the normal red pattern, 18 times as coarse as the normal green pattern, and 30 times as coarse as the normal purple pattern.

In the system described in the aforementioned application to maintain a phase lock between the master and slave transmitters, it was necessary for the slave to receive a signal from the master at all times and this signal had to bear a fixed phase relation to the radiated master signal. It was found that during periods when an additional signal was radiated by the slave transmitter, considerable mixing took place which could produce a signal of the master frequency. For example, in one system, the frequencies for producing the normal pattern were in the ratio of 6 to 8, the 6 being radiated from the master and the 8 from the slave. For producing the coarse pattern, an additional signal of frequency corresponding to 5 was added to the master transmission and a signal of frequency 9 was added to the slave transmission. At the slave transmitter signals of the master frequency 6 were produced particularly by two combinations viz. the sixth harmonic of the 8 and 9 difference and the difference signal of the third harmonic of the 8 and the second harmonic of the 9. This mixing is a result of non-linearity of components common to the two slave frequencies. Tubes, corona, earth conductivity and to a lesser extent condensers and coils under high electrical stress are sources of non-linearity and mixing. Heretofore these difficulties have been overcome by using, at the slave station, traps and a directional receiving antenna which may be nulled on the interfering signal and located so as to receive the maximum signal from the master station. By such means it has been possible, at a slave station 50 miles from the master and having a site with reasonably good earth conductivity, to reduce the ratio of unwanted interference signals to wanted master signal to such a degree as to introduce a negligible error.

However, when a second slave station was set up at a distance of about 100 miles from the master station, the mixing problems there were found to be many times worse than at the first slave station. It was found that an arrangement which would give reasonably useful results one day would fail completely the following day. Whilst a good null could be had on the receiving loop for the signal from the master, the null obtainable from the interfering signal resulting from mixing was always poor and its position would shift over a period of time. The combination of reduced master signal and high mixing due to poor earth made it substantially impossible to maintain the required fixed phase relations.

It is an object of the present invention to provide means for avoiding this problem of mixing.

It is also an object of the present invention to enable very short duration transmissions (for example of a duration less than a second) to be employed in such navigation systems. Such short duration transmissions may for example be superimposed periodically on some other transmission which then would only be subjected to very short periods of modification of interruption. Alternatively the short duration transmissions might be radiated in rapid succession, in which case the navigation system would provide a number of different positional indications which could be in such rapid succession that for navigation purposes they could be regarded as simultaneous indications even in a fast moving vehicle such as an aircraft.

According to this invention, in a radio navigation system in which transmissions from fixed transmitters are radiated sequentially to provide a number of positional indications at a mobile receiver, means are provided for radiating control signals at the commencement of each transmission to initiate the operation of a holding system at the receiver for maintaining the corresponding indication for a period longer than the duration of the transmission. By this arrangement, the duration of the transmission may be made very much shorter than the period required to observe and if necessary record the indications provided by the receiver.

It will be appreciated that in radio frequency phase comparison systems, signals radiated simultaneously have to be on different frequencies if they are to be distinguished at the receiver. The use of sequential transmissions for giving different positional indications therefore effects a considerable economy in the frequency requirements as well as in the receiving apparatus.

It is also an object of this invention to provide an electronic phase shifting circuit so arranged as to maintain a substantially constant output amplitude regardless of the magnitude of the phase shift.

It is an additional object of this invention to provide a novel crystal controlled oscillator circuit which includes electronic means for controlling the oscillator to provide for small changes in output frequency.

It is another object of this invention to provide a frequency divider circuit for producing from one input signal a sub-harmonic output signal and including means for synchronizing operation with a second input signal of lower frequency than said one input signal.

It is also an object of this invention to provide in a receiving apparatus of the character set forth, a novel and improved controlling circuit for synchronizing the sequential operation of the receiver indicators with the sequential operation of the transmitters.

It is another object of this invention to provide in a system of the character described a phase comparison standard for use at the slave transmitters and at the mobile receivers which includes a means responsive to a received signal for controlling the frequency and phase relations among the reference signals.

It is an additional object of this invention to provide a receiving apparatus for use with a navigation system of the character referred to which includes a novel indicating apparatus and control means therefor for indicating and correlating on a single instrument two separate position coordinates.

It is a still further object of this invention to provide an indicator of the character described which enables one of a number of fine but ambiguous positional determinations to be identified by a coarse but less ambiguous positional determination.

Other objects and advantages of this invention will be apparent from a consideration of the following specification, read in connection with the accompanying drawings, wherein.

According to this invention, in a radio navigational system having spaced master and slave transmitters arranged to radiate signals of different but harmonically related frequencies, the master transmitter is arranged to radiate stable frequency master signals and the slave transmitter comprises a frequency stable oscillator coupled to an antenna to provide a radiated slave signal, means for receiving the master signal and means operative on the slave oscillator for maintaining a fixed phase relation between the radiated master and slave signals, the slave oscillator being of sufficient stability to maintain the said fixed phase relation during periods when the reception of the master signal at the slave station is interrupted. It will be understood that two or more slave transmitters may operate with a single master station and in this case each slave transmitter will be provided with its own frequency stable oscillator.

The master transmitter may comprise a crystal-controlled oscillator, amplifying and transmitting means coupled to the oscillator to provide the radiated master signal and means for maintaining a fixed phase relation between the radiated signal and the oscillator output. It is essential to maintain the fixed phase relation between the radiated master and slave signals. To achieve this conveniently a slave transmitter may comprise a crystal-controlled oscillator coupled to an antenna to provide a radiated slave signal, means for maintaining a fixed phase relation between the slave oscillator output signal and the received master signal and means for maintaining a fixed phase relation between the radiated slave signal and the slave oscillator output signal.

The provision of separate oscillators at each slave station in a navigational system in which the transmissions are periodically modified as described above enables the received locking signal from the master station to be interrupted during the periods of the modified transmissions whilst still maintaining the correct phase relationship between the radiated master and slave signals. Furthermore, this arrangement enables the signals to be radiated in the correct phase relation during any interruptions of the locking from the received master signals such as might occur for example in the event of a severe thunderstorm in the immediate neighborhood of the slave station preventing radio reception of the master signals.

Means may be provided for periodically altering the frequency of the master signals for short intervals of time to control the intermittent operation of a slave transmitter or transmitters as is described hereinafter. The crystal-controlled oscillator will then prevent the slave station from falling out of phase during these short intervals of time. The altered frequency control signals may be detected at a mobile receiver and used as necessary to identify and control the display of the different positional indications.

Preferably the duration of the altered frequency signals from the master transmitter is made small compared with the durations of the changed operation of the slave transmitters which is initiated by the altered frequency signals.

In the particular embodiment to be described there are four transmitting stations of which one is a master station radiating normally on the sixth harmonic of a fundamental frequency and the other three are slaves which radiate normally on the eighth, ninth and fifth harmonics respectively and are known as the red, green and purple slaves. These four stations constitute a chain. The following description only relates, so far as the transmitters are concerned, to a single chain. The receiver for use on a vehicle, however may be moved out of the coverage area of one chain into that of another. These different chains are similar but in order to avoid interference the different chains operate with slightly different fundamental frequencies.

The transmissions on the frequencies mentioned above provide an accurate position determination in the manner hereinbefore described. As previously explained, a more coarse but unambiguous positioned indication is sometimes required and this is provided by periodically modifying the transmissions from the various stations. For the purpose of simplifying the ensuing description, the areas between adjacent equiphase lines of the fine pattern and having an angular scope of 360 electrical degrees will be referred to as lanes. The coarse pattern enables a particular one of a group of lanes to be identified and thus the transmissions providing the coarse pattern are referred to as lane identification transmissions.

In the arrangement now to be described, once a minute for a period of half a second, the green and purple slave transmissions are interrupted and a signal of the ninth harmonic (i. e., the normal green frequency) is radiated from the red slave in addition to the eighth harmonic signal. At the same time a signal of the fifth harmonic (i. e. the normal purple frequency) is radiated from the master station in addition to the sixth harmonic signal. During the period of these transmissions, the receiver can make a phase comparison, between signals received from the master and red slave, at a lower frequency than that at which the phase comparison is made during the normal transmissions and so, a more coarse but less ambiguous positional determination may be made.

The interruption of the normal signals is of such short duration that the normal accurate position indication is not affected. The normal indicators may be slugged to prevent any momentary alternation during this half second.

Fifteen seconds later, the transmissions from the red and purple transmitters are interrupted for half a second whilst the green slave transmits on the eighth and ninth harmonics and the master transmits on the fifth and sixth harmonics. This gives a coarse positional indication with respect to the green pattern. After a further fifteen seconds, the transmissions of the red and green slaves are interrupted for half a second whilst the purple slave radiates on the eighth and ninth harmonics and the master radiates on the fifth and sixth harmonics. It will be noted that in this case, the normal transmission from the purple slave has to be interrupted and replaced by two transmissions on different frequencies. There is then an interval of a half a minute during which the normal transmissions are radiated until the next red pattern identification transmission.

As will be described later the required switching at the slave transmitters and in the receivers is controlled automatically by means of very short duration signals from the master station. These control signals consist in a small change in frequency for a duration of one twenty-fifth of a second.

Figure 1:
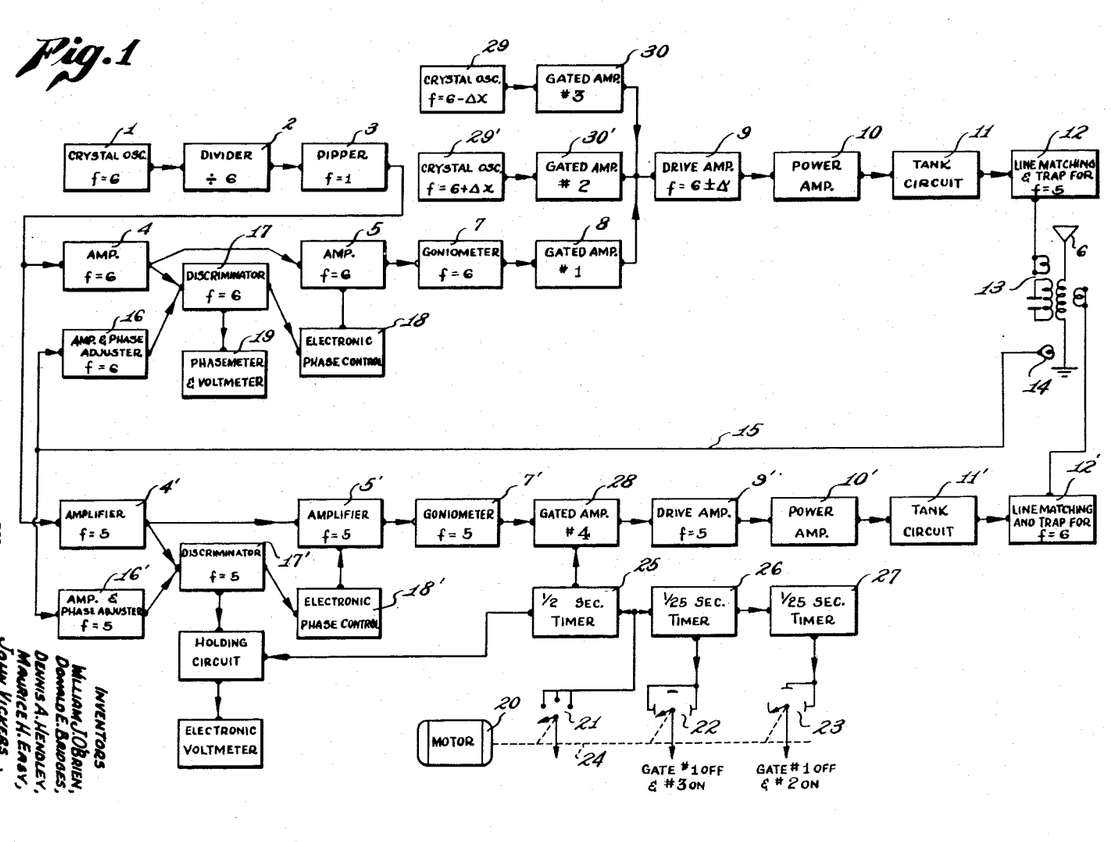
Figure 1 is a block diagram illustrating the apparatus comprising the master transmitter of one navigational chain.

Figure 1 is a block diagram of the master oscillator, locking unit and antenna feed system comprising the master transmitter. The crystal oscillator 1 is a very stable oscillator of special design which will be described in detail later. This feeds a divider 2 whose output frequency is that of the fundamental of the system. (In all of the block diagrams the frequencies given are the harmonics of that fundamental frequency.) This output signal is applied to a pipper 3 whose output comprises a series of short duration pulses. At least the first ten of the harmonics of this signal are of equal amplitude and have exactly the same multiple-phase relation. This is the proper phase relation of all radiated signals at the location of the master antenna. This pipper signal is therefore used as the phase standard for the master normal signal and the master lane identification signal and is fed into the amplifiers 4 and 4'. The amplifier 4 is the start of the normal master signal and its output feeds the amplifier 5. The output of amplifier 5 is carried on to the antenna 6 after passing through the calibrated phase adjusting goniometer 7, the gated amplifier 8, driver amplifier 9, power amplifier 10, tank circuit 11, line matching and trap circuit 12 and antenna tuning circuit 13.

A pick-up coil 14 is tightly coupled to the earth return of the antenna and provides a voltage which is in phase quadrature to that of the antenna current. This signal is piped back through line 15 to the inputs of the amplifiers 16 and 17. It is desirable to include a step-down coupling transformer between the line and the amplifiers and this transformer should be of zero phase shift design. The amplifier 16 provides a phase locking signal when combined with the signal output of amplifier 4 in the discriminator circuit 17. The phase locking signal is applied to an electronic phase control circuit 18 which operates on amplifier 5. The voltage applied to the electronic phase control is indicated by unit 19. The control voltage is normally held near zero by manual adjustment of the goniometer 7. The electronic phase control circuit 18 is of special design and is described in detail hereinafter.

The apparatus described so far effects a normal master radiation which is locked in stability to that of the crystal oscillator. For identification signalling the normal radiation is interrupted and replaced by a short duration signal of different frequency. Two signalling frequencies are used, one being lower than normal by 60 cycles and the other higher by 60 cycles. To indicate the start of the red pattern identification the 60 cycle minus signal is applied for one twenty-fifth of a second, for green the 60 cycle plus signal is radiated for one twenty-fifth of a second, and for purple the 60 cycle minus signal pulse is immediately followed by a 60 cycle plus pulse. A one minute cycle of identification is used and is started by red, followed by green after a fifteen second interval, and then followed by purple after a second fifteen second interval.

At the start of each identification a purple signal radiation is added to the normal signal for a period of one half second. These two signals have the same in-phase relation to each other as is present in the output of the pipper unit 3.

Referring again to Figure 1 a synchronous motor 20 is provided with a shaft 24 which rotates the switches 21, 22 and 23 at one revolution per minute. The switch 21 fires a half second timer 25 and a one twenty-fifth second timer 26. The back edge of the one twenty-fifth second pulse of timer 26 fires a one twenty-fifth second timer 27. The half second timer 25 opens a gated amplifier 28, thereby effecting the half second fifth harmonic pulses which are derived from the fifth harmonic amplifier 5', fed through a manual phase shifter 7' to the gated amplifier 28 and passed on to the antenna 6 through units 9', 10', 11' and 12' which are similar to 9, 10, 11 and 12. The 60 cycle minus signalling signal is generated by a crystal oscillator 29, the output of which feeds a gated amplifier 30 which in turn feeds the driver amplifier 9. The 60 cycle plus signalling is provided by similar units 29' and 30'. The gated amplifiers 30, 30' and 8 are controlled by the output of the aforementioned commutator switches 22 and 23 as shown.

Figure 2:
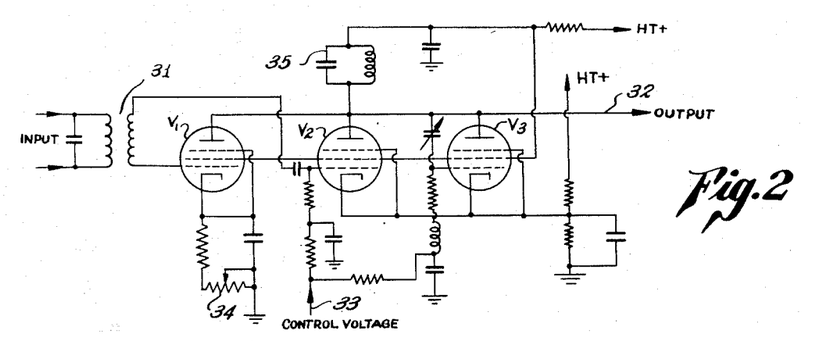
Figure 2 is a circuit diagram of the electronic phase controller shown in Figure 1.

The electronic phase controller 18 hereinbefore mentioned and its cooperative association with the amplifier 5 is shown in detail in Figure 2. The sixth harmonic input signal from amplifier 4 is applied to an input transformer 31, and the output signal is applied to goniometer 7 by conductor 32. The circuit is controlled by a direct control potential which is applied to conductor 33 by the phase discriminator 17, the magnitude of this control potential being representative of the phase angle between the two signals fed to the discriminator 17.

As is shown in Figure 2, two amplifier tubes V1 and V2, which have their anodes connected in parallel, are fed from the input transformer 31 with input signals which are equal in amplitude but differing from phase opposition by a small angle. The tube V1 is a fixed gain amplifier but tube V2 is a controlled gain amplifier, the control voltage from the lead 33 being applied to the input grid. The gain of the tube V1 is adjusted by means of the adjustable biasing resistor 34 so that when the gain control voltage on tube V2 is zero, the gain of tube V1 is such as to produce a combined output signal from tubes V1 and V2 which is at quadrature to that of tube V2 operated alone. When this setting is made, a change in the gain of tube V2 will produce a phase shift in the output signal and also an alteration in the magnitude of the signal voltage. The voltage output will be equal to the secant of the phase shift times the normal or zero control output of the two tubes.

There is also provided a reactor tube V3, the control grid circuit of which is connected to control lead 33 and phased to produce a capacitive reactance. The equivalent capacity is used as a controlled capacity in the tuning of a tank circuit 35 in the output circuit of the amplifier tubes V1 and V2. This tank circuit is tuned so as to be at resonance when zero control volts are applied to the tube V3. A change in the control voltage applied to the variable reactance tube will produce a phase change and also a voltage change in the output of the tank circuit 35. The voltage output will be equal to the cosine of the phase shift times the normal or zero control output. The same control voltage is applied to tubes V2 and V3 and provided an equal phase shift is made by an equal change in control volts to the two types of phase shifters, the output at the tank circuit 35 will remain substantially constant over a phase variation of plus or minus 120°.

The phase discriminator 17 operates to detect any phase shifts in the radiated signal relative to the output of amplifier 4—phase shifts which may result, for example, from the swaying of antenna 6 in the wind. The control voltage produced by the discriminator 17 shifts correspondingly and so controls the electronic phase controller 18 as to offset the initial detected phase shift. As a result, a substantially fixed and unchanging phase relation is maintained between the output of pipper 3 and the sixth harmonic signal radiated from antenna 6.

The red and green slave stations each comprises a slave crystal locking unit, a drive unit, and an antenna feed system. One function of the slave crystal locking unit is to provide a crystal controlled pipper output similar to that of the unit 3 of Figure 1. A second function is to provide synchronized lane identification switching. One of the functions of the drive locking unit is to provide synchronization between the phase of the pipper signals received from the first unit and phase of the slave radiated signals. A second function of this unit is to provide signal gates which are operated by the switching provided by the first unit.

Figure 3:
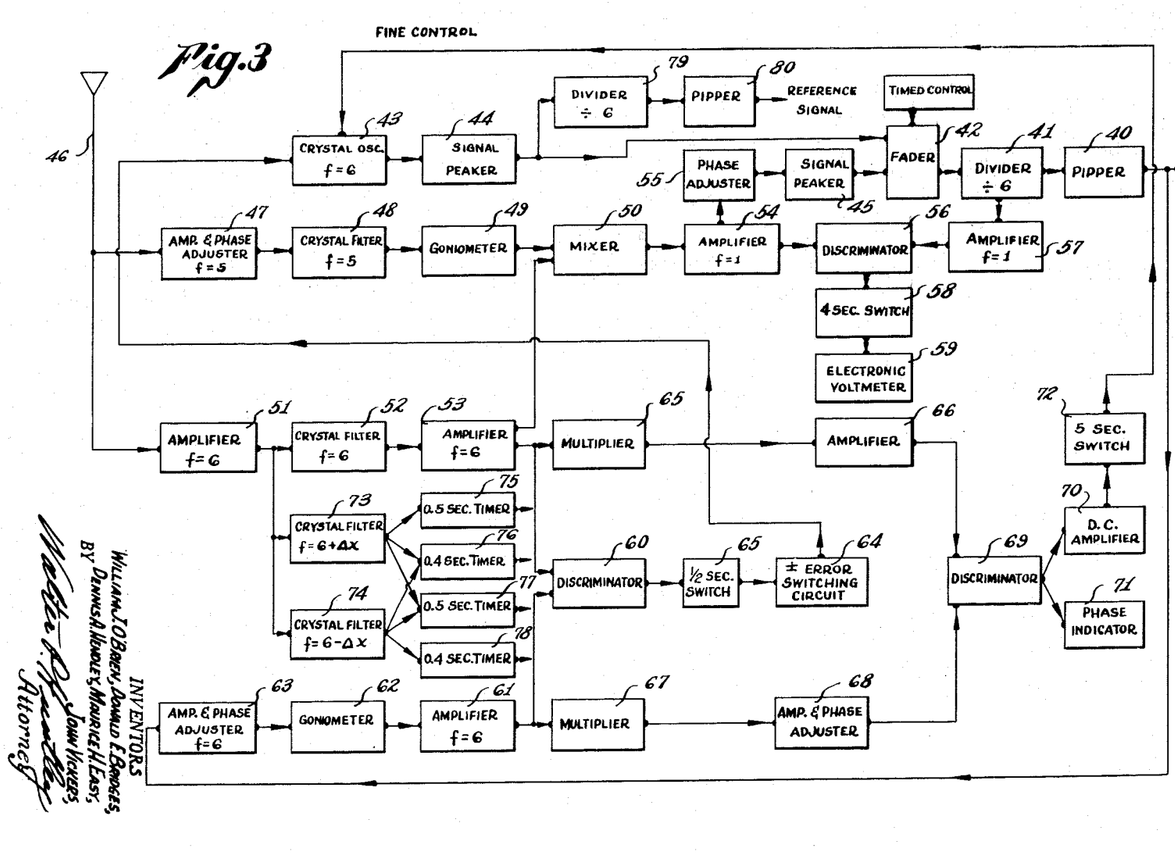
Figure 3 is a block diagram illustrating the apparatus employed in the slave crystal locking unit employed at each of the slave stations.

The slave crystal locking unit is shown in block form in Figure 3. In the upper right corner there is shown a pipper 40, the output signal of which feeds the drive unit (described hereinafter), input signal for the pipper 40 being obtained from a frequency divider 41. This divider is driven normally by a phase controlled crystal oscillator 43 operating at the master frequency which in turn is controlled by the received master signal. This leaves a six to one ambiguity in the signal after division which is connected by a once-per-minute lock on the divider 41 by a signal derived by heterodyning the purple and master signals (i. e. the fifth and sixth harmonic signals) transmitted from the master during a lane identification half second period. The construction and operation of the divider 41 are described in detail hereinafter.

A fader 42 which is used to switch the divider input is described in detail hereinafter. The master frequency signal is fed from the oscillator 43 to the input of the fader 42 through a signal peaker 44. Likewise, the fundamental frequency signal received during the short duration lane identification transmission is fed into the fader 42 through the peaker 45. These peakers are used to ensure a more accurate phase lock on the divider. To obtain the fundamental frequency signal for the divider from the master signals which are picked up by the receiving antenna 46, these signals are fed into an amplifier 47 tuned to the fifth harmonic followed by a crystal filter 48 and a calibrated goniometer phase control 49 and the mixer 50. The receiving antenna 46 is also fed into the amplifier 51 tuned to the sixth harmonic, followed by crystal filter 52, amplifier 53 and the mixer 50. The beat note of the fifth and sixth harmonic signals fed into the mixer 50 is delivered as its output which is fed into amplifier 54. The fundamental frequency signal output of amplifier 54 is fed through a phase adjuster 55 into the aforementioned signal peaker 45. A phase standardizing indicator is provided by means of the discriminator 56 which compares the phase of the signals of the fundamental frequency from amplifiers 54 and 57. The amplifier 57 is fed with signals of this fundamental frequency from the divider 41. The output of the discriminator is indicated by the vacuum tube voltmeter 59 which is provided with a holding switch 58.

The crystal oscillator 43 is supplied with two control signals for controlling the phase of its output. One is a fast control and is derived from a discriminator 60 comparing the received master signal and the master frequency signal of the pipper 40. The second is a slow or fine control and is derived from a discriminator 69 comparing the two signals mentioned above after multiplication in frequency. As will be described in greater detail later, the fast control overrides the fine control, thus eliminating the ambiguities in the fine control due to the multiplication in frequency. The fast control is arranged to come into action only when the error has exceeded a pre-set amount.

The fast control discriminator 60 compares the phase of the sixth harmonic output signals of amplifiers 53 and 61; amplifier 61 is fed from the output of pipper 40 via a calibrated goniometer 62 and amplifier 63. The output of discriminator 60 is applied to the plus or minus error switching circuit 64 through a 0.5 second cut-off switch 65 which blocks the operation during the lane identification period. The output of amplifier 53 is also fed through a frequency multiplier 65 to an amplifier 66. Likewise the output of amplifier 61 is fed through a frequency multiplier 67 to an amplifier 68. The discriminator 69 compares the phase of the signals from amplifiers 66 and 68 and its output is applied to a D. C. amplifier 70 and also to a phase indicator 71. The output of the amplifier 70 is applied as a frequency control voltage onto the crystal of the oscillator 43 through a cut-off switch 72 which prevents a change of control voltage during the lane identification periods. The application of a voltage to the crystal slightly alters its frequency, thus slowly changing the phase of the output. A detailed description of the construction of the oscillator 43 is given hereinafter, together with a detailed explanation of the construction and operation of the frequency control circuits.

During the half second lane identification periods when the control voltage is interrupted by the cut-off switch 72, the oscillator continues at the same frequency so maintaining the required phase of the slave signals. The interruption of the locking from the master signal during these periods prevents any errors due to mixing of the radiated eighth and ninth harmonic slave signals, which mixing as explained earlier may produce a sixth harmonic signal.

Selection and synchronization of the three periods of lane identification (red, green, purple), is obtained by the timing apparatus comprising a plus frequency filter 73 and a minus frequency filter 74 which are coupled to the output of amplifier 51, and the four electronic timers 75, 76, 77 and 78. Operation of the 0.4-second timer 78 selects the red period, the 0.5-second timer 75 selects the green period and operation of both 75 and 78 selects the purple period. The 0.5-second timers operate lamps to identify the period of identification; they also select the period of operation for the 0.4 second fader control applied to the fader 42 and the period for the 0.5 second transmission of the slave identification signals. The 0.4 second timer 76 is used to operate all phase indicating holding circuits, i. e., a charged condenser to hold the phase reading which is obtained during identification, thus permitting an easy reading.

The output of the signal peaker 44 is also fed into a divider 79 which in turn feeds a pipper 80. The divider and pipper are duplicates of those shown as 41 and 40. The output of pipper 80 is used as a reference signal for standarding the unit and phase adjusters are provided for the purpose.

To standardize the unit the normal inputs to amplifiers 47, 51 and 63 are cut off and replaced by the reference signal. The calibrated goniometers 49 and 62 are set to zero. The phase adjuster of amplifier 63 is set to give a zero reading on the phase indicator 71. The control on fader 42 is switched from normal to fundamental lock. The phase adjuster 55 is set for zero indication on meter 59 (switched for continuous reading). The control on the fader 42 is then switched back to normal and the phase adjuster of amplifier 47 is set to give zero reading on meter 59. The reference input is cut and replaced by the normal inputs. The goniometers 49 and 62 are set to these operational settings and the unit is correctly set for operation. For continuous operation the operational unit cannot be switched over for setting or referencing but the standby can, and having been set it may be used as a reference for setting the operational unit.

Figure 4:
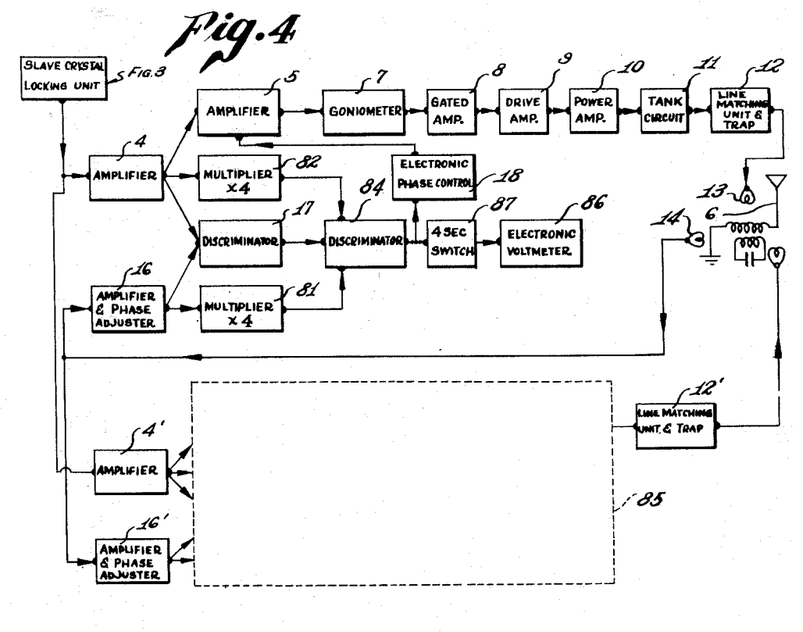
Figure 4 is a block diagram illustrating the apparatus comprising the drive unit and antenna feeding system used at the slave stations.
Figure 5:
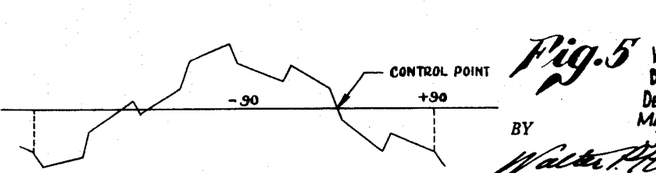
Figure 5 is a graph representing the character of control potential developed by the phase discriminator included in the apparatus shown in Figure 4.

The input to the slave drive unit shown in Figure 4 is obtained from the output signal of the pipper 40 of the slave crystal locking unit shown in Figure 3. The similarity between Figure 4 and Figure 1 is so great that only the small difference need be described. The same reference characters have been assigned to the similar units of Figure 1 and Figure 4. The essential difference is the discriminator control arrangement. In Figure 4 the output of discriminator 17 is added to the output voltage of a second discriminator 84 whose normal output is dependent on the phase difference of the signal outputs of two frequency multipliers 81 and 82 connected respectively to the amplifiers 4 and 16. The output of discriminator 84 is clipped or limited to about one-tenth its maximum. Under normal operation the discriminator output never reaches the clipping level and the discriminator 84 is the main control. For large errors the discriminator 17 acts as a spoiler for discriminator 84 so that a phase lock on an erroneous phasing due to frequency multiplication is made impossible when proper operation care is taken. The probable condition to be met would be a 30° error in one of the goniometer settings and an instantaneous error of 60° in the antenna phasing, both in the same direction. This requires a correction of 90° from the electronic phase control 18. In practice, the correction obtainable is about 150°. Figure 5 shows the combined signals from the two discriminators when a multiplication factor of four is used. This curve is obtained by combining a sine curve, representing the variation of control voltage with phase of the discrimination 17, with the clipped sine curve of four times the frequency which represents the variation of control voltage with phase of the discriminator 84. When an odd multiplication is used the slope at erroneous zero level is in the wrong direction for locking and no error control range exists.

Referring back to Figure 4, the discriminator output is indicated by the electronic voltmeter 86. The holding switch 87 is normally set for continuous reading for the normal frequency unit. The rectangle indicated by the dashed lines 85 represents the corresponding locking unit for the second frequency which has to be radiated by the slave transmitter. This second locking unit is similar to that already described.

At the purple slave the locking unit comprises three control channels, i. e. the normal purple, and a red and a green lane identification channel, controlling the radiations on the fifth, eighth and ninth harmonics respectively.

Figure 6:
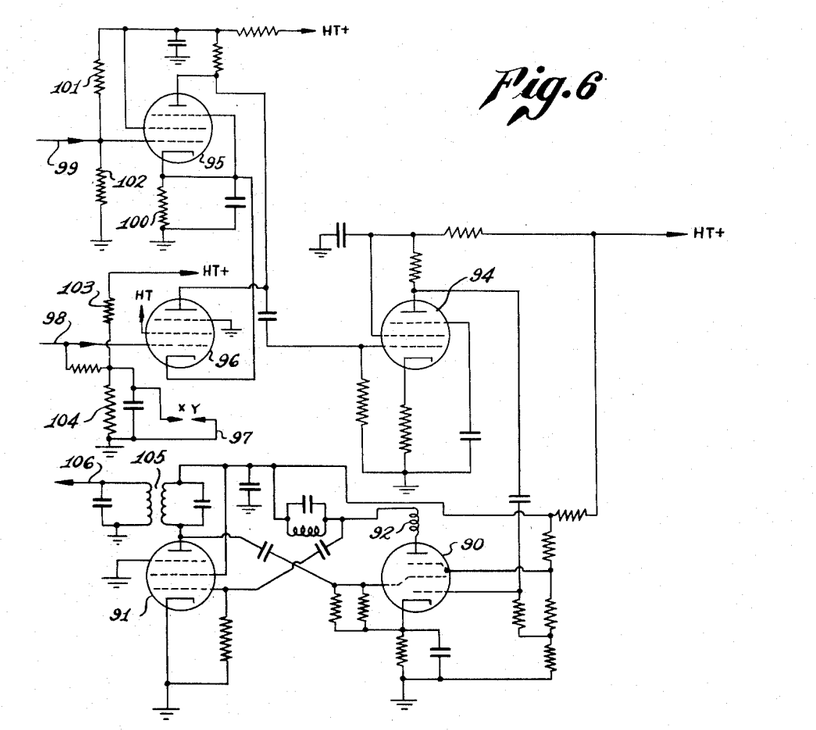
Figure 6 is a circuit diagram illustrating the construction and arrangement of the fader and frequency divider units shown in Figure 3.

The aforementioned fader 40 and divider 41 are illustrated in Figure 6 wherein 90 is the input divider tube and 91 is the output divider tube. The two tubes are arranged as a positive feedback amplifier and self-oscillation will take place at about the fundamental frequency. When a signal of the fundamental frequency is applied to the first control grid of the input tube 90 the frequency of the divider is locked to it. If some harmonic frequency is applied to the feed-back signal on the second grid of tube 90, acting as a gate, the operation of the tube is blocked for all but one short period of a cycle of the fundamental and a lock in multiple frequency is maintained. A ringing transformer 92 is used in series with the anode of tube 90. Tube 94 operates as a phase inverter which reverses the negative peak signals of fader tubes 95 and 96 into positive peaked signals to be applied to the input of the divider.

The fader tubes 95 and 96 are fed respectively with sixth harmonic and fundamental frequency peaked signals from the signal peakers 44 and 45 of Figure 3 and the operation of the two tubes is controlled by relay contacts 97. The relay is a part of the timer control shown in Figure 3 and is controlled by the received frequency shifted signals and arranged to open the contacts once a minute for the short period whilst the fifth and sixth harmonic signals are radiated by the master station. These two signals are mixed in the mixer 50 of Figure 3 and the fundamental frequency heterodyne signal applied to the input grid of tube 96 by conductor 98. The sixth harmonic signal from the signal peaker 44 (Figure 3) is applied to the grid of fader tube 95 by means of conductor 99. The two tubes 95, 96 have a common cathode resistor 100. These control grids are biased by potential divider circuits 101, 102 and 103, 104 respectively in such a manner that when tube 96 is made conductive, tube 95 is cut-off. Thus a fundamental frequency synchronizing signal is fed to the phase inverter 94 once a minute whilst during the remainder of the time, a sixth harmonic signal is fed to the tube 94. The points marked XY in the circuit of contacts 97 are connected to a test switch which in its normal position completes the circuit. The test switch enables the circuit to be opened continuously whilst the phase adjustor 55 is set during the standardizing operation as has been described above.

From the inverter tube 94 the signals are fed to the input divider tube 90. The output tube 91 of the divider circuit has a tuned output transformer 105 from which signals are fed to the amplifier 57 and pipper 50 (Figure 3) by conductor 106.

Figure 7:
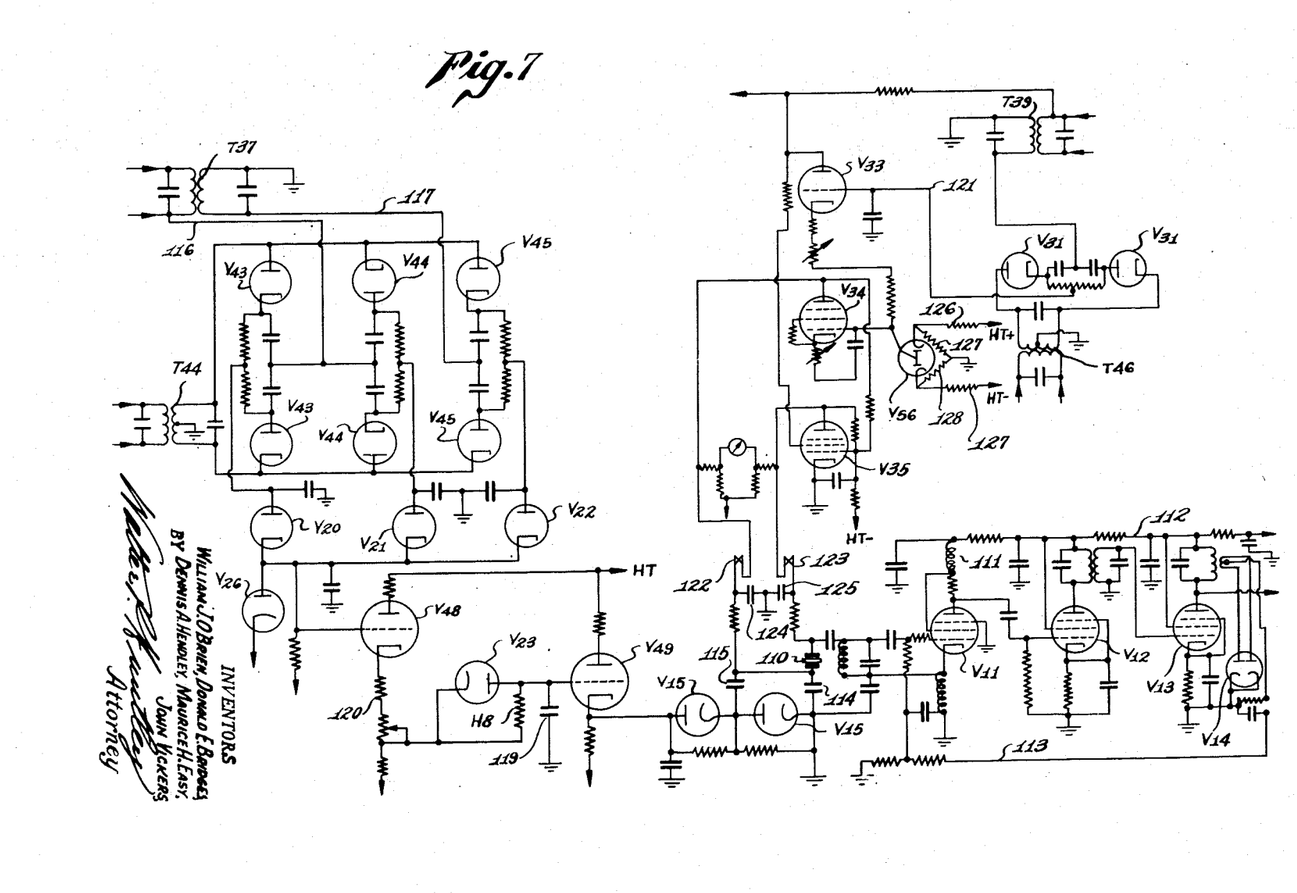
Figure 7 is a wiring diagram showing the details of construction of the flywheel oscillator together with the fine and fast frequency controls therefor as shown in Figure 3.

There is shown in Figure 7 the circuit diagram for the flywheel oscillator 43 of Figure 3, together with the circuits used for effecting the aforementioned fine and fast (of the order of one cycle per second) control of the generated frequency. As shown in Figure 7, tubes V11, V12, V13, and V14 and their associated components are arranged to form an improved Colpitts oscillator the frequency of oscillation being controlled by a crystal 110 which is connected in the grid circuit of tube V11. An inductance 111 in series with the screen and anode H. T. supply line 112 is sued to minimize frequency changes due to changes in the internal cathode to screen and cathode to anode resistance. Pentode tubes V12 and V13 are arranged as amplifiers to provide an output signal at the anode of V13 and to supply signal to the automatic gain control diode V14. The high gain A. G. C. which is fed back through lead 113 to the control grid of V11 limits the signal applied to the input of V11 to a few millivolts. A manual control of the oscillator frequency is provided by a variable condenser 114 in series with the crystal 110. A voltage controlled diode switch (double diode V15 which for convenience is illustrated as two single diodes), is used to short out the variable condenser 114, thus causing an instantaneous change in frequency, which change is chosen to be of the order of two parts in one hundred thousand. Normally a small negative voltage is maintained on the control conductor T; this leaves both diodes non-conducting and the diode switch applies only a small stable capacity across the frequency control condenser 114. When the voltage on conductor T is made postive, both diodes become conductive and the control condenser is effectively shorted. A 10,000 mmfd. condenser 115 is used to isolate the direct current voltages from the crystal 110. The frequency change resulting from the operation of the diode switch is equivalent to introducing a lagging phase shift at a rate which is slightly greater than 360° per second. When a large error is present the switch is operated and the phase change continues until the correct phasing is reached.

The apparatus used for generating the operating voltage for this fast phase control switch includes a transformer T37 which supplies two signals in phase quadrature on the leads 116, 117. These signals are amplified signals originating from the received master signals and taken from amplifier 53 (Figure 3) and may be considered as phase standards. A transformer T44 supplies two signals in phase opposition and these signals are derived from the output, the phase of which is to be controlled and are taken from the amplifier 61. The signals from the transformers T37 and T44 are applied to a double diode V43 (shown for clarity as two single diodes) to produce a D. C. voltage output which is approximately proportional to the sine of the deviation from the desired phase difference of the comparison signals. The output of a similar arrangement of a double diode V44 is reversed in sign to that of a double diode V43. The second of the two signals of T37 viz. the signal on lead 117 is used for the phase comparison with the two signals from T44 to produce an output from a double diode V45, which is a cosine function of the desired phasing. The outputs of these three diodes are rectified by three diodes V20, V21 and V22 to produce on the control grid of a triode V48 a potential which is equal to the highest positive voltage produced by the outputs of the three phase comparison diodes.

The tube V48 is used as a cathode follower to reduce the resistance of the control voltage applied to its grid. The control voltage which now appears on the cathode of tube V48 is fed onto the grid of a second cathode follower tube V49 through a diode V23. A resistance 118 shunting the diode V23 in combination with a condenser 119 connected between the control grid of the triode V49 and earth form a delay network which prevents a rapid build-up of positive voltage on the grid of tube V49. The discharge of a positive voltage applied to the time delay condenser 119 is through the forward resistance of the diode V23. The delay condenser 119 is therefore provided with a long time constant for its charging time and a very short one for discharge. The voltage on the condenser 119 is applied to the fast phase control switching diode V15 through the cathode follower tube V49, the output being fed from the cathode of tube V49 to the diode V15 through the conductor T, as shown.

Figure 8:
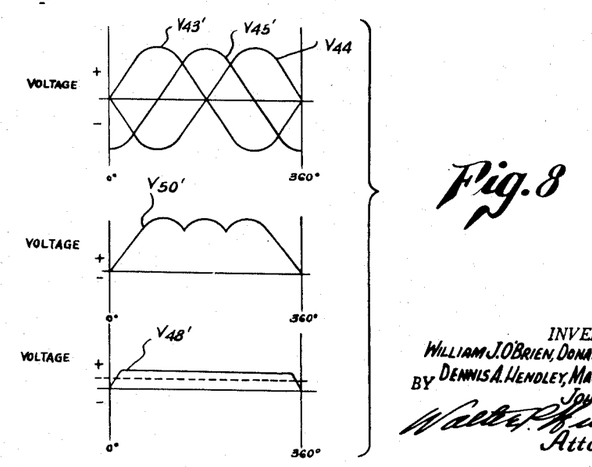
Figure 8 is a graph illustrating the character of control potential used to regulate the operation of the oscillator shown in Figure 7.

Voltage diagrams of the various signals described are shown in Figure 8. Diagram *a* shows the voltage outputs of the three diodes V43, V44 and V45 plotted against deviation from the desired phase difference, the three outputs being represented respectively by the curves V43', V44' and V45'. The line V50' of diagram *b* shows the variation of voltage of the combined signals after rectification by diode V50. In order to even up the delay timing, a diode V26 (Figure 7) is provided with its anode connected to the control grid of tube V48 and its cathode maintained at a small voltage above earth. The diode acts as a clipper to limit the output from the rectifiers. The result of this is shown by the line V48' in diagram *c* of Figure 8. The dotted line V15' shows a delay voltage which is applied to the switching diode V15. This delay voltage is used to control the plus and minus error to be tolerated before the fast phase control comes into operation. The delay is set by the adjustment of a potentiometer 120 in the cathode circuit of tube V48.

The circuit which supplies the control voltage for the fine phase control includes a transformer T39 which supplies two signals in phase quadrature. These signals are amplified signals originating from the received master signals and taken from amplifier 66 (Figure 3) and may be considered as phase standards. These signals are derived from the same source as the signal input to the tranformer T37 but are of a multiplied frequency so as to make the fine phase control responsive to small changes in phase between the oscillator output signals and the phase standard. Signals of the same multiplied frequency derived from the oscillator output and taken from amplifier 69 (Figure 3) are applied to a transformer T46 to provide two output signals in phase opposition. Double diode V31 (which for convenience is shown as two single diodes) forms a phase discriminator circuit which compares the phases of the inputs to transformers T39 and T46. The double diode V31 is connected to provide a potential on lead 121 which is proportional to the cosine of the phase angle between the inputs of transformers T39 and T46 and this potential is applied to the control grid of a cathode follower tube V33 which feeds a D. C. amplifier comprising tubes V34 and V35. This is a push-pull amplifier and the outputs are shown as P and Q.

This output, when applied as shown to the crystal 110 will change its frequency slightly so causing the phase to shift slowly, and this control voltage is applied in the correct sense to maintain a proper phasing of the crystal output with respect to the phase standard signals. Switches 122, 123 are elements of switch 72 (Figure 3) and are provided to cut off the control voltage during the lane identification transmissions. Holding condensers 124, 125 are provided to maintain during these periods the voltage applied during the normal operation.

To limit the voltage applied to the crystal, there is provided a limiter circuit comprising a double diode V56 and a potential divider circuit formed by the resistors 126, 127, 128 and 129. This circuit limits the voltage swing of the signal applied to the input grid of the amplifier tube V34.

Figure 9:
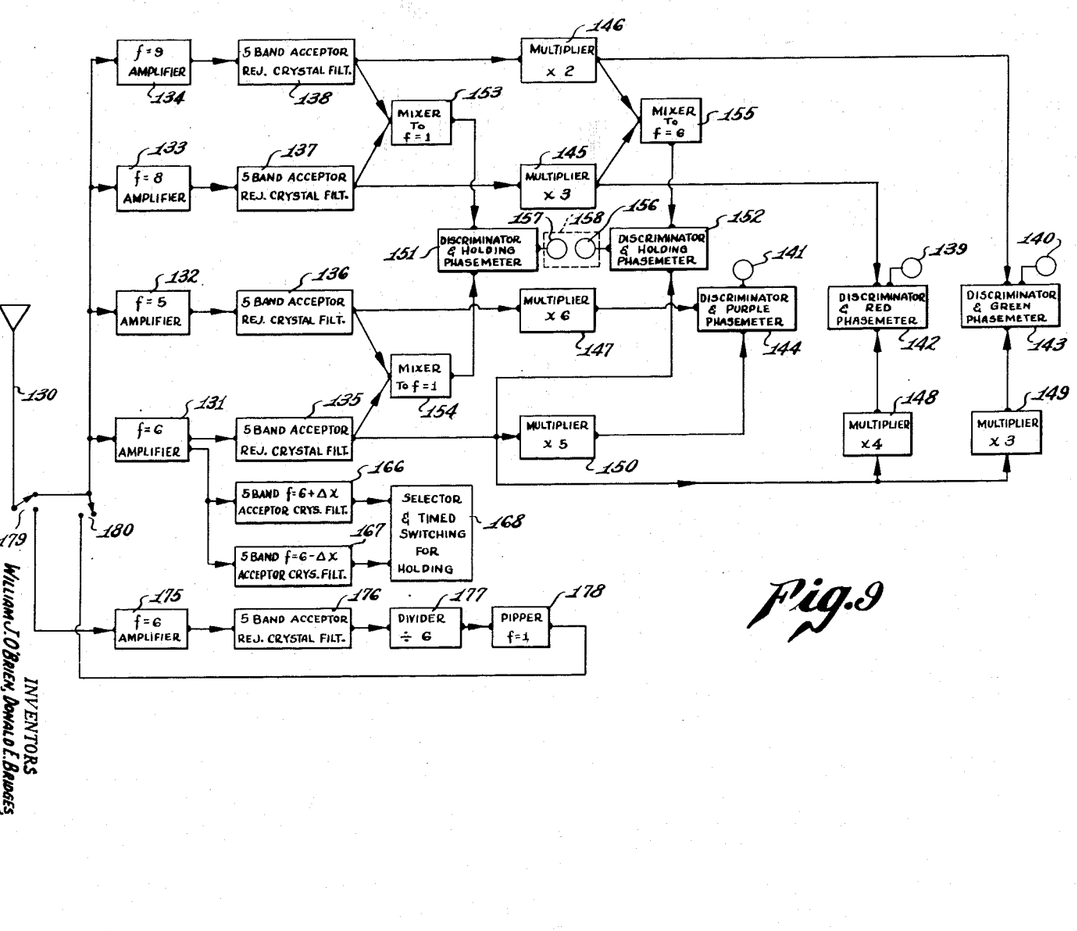
Figure 9 is a block diagram illustrating the apparatus employed in a mobile receiver for use with a navigation system of the character disclosed herein.

Figure 9 is a block diagram of the multiple band mobile receiver. The navigation signals are picked up by an aerial 130 and fed to four amplifiers 131, 132, 133 and 134 which are tuned respectively to the sixth, fifth, eighth and ninth harmonics of the fundamental frequency. From the amplifiers, the signals are passed through five band acceptor-rejector crystal filter circuits 135—138 which select the signals from the desired chain. During the periods of the normal transmission, the signals from the three slaves are each compared with the signals from the master station to give the fine positional determinations which are indicated on red, green and purple phase meters 139—141 connected to be operated by discriminators 142—144 respectively. To effect this phase comparison, the slave signals are multiplied in frequency by the multipliers 145, 146 and 147 to the 24th, 18th, and 30th harmonics respectively before being fed to the discriminators 142—144, and the master signals are multiplied by frequency multipliers 148—150 to provide the second like frequency inputs to the three discriminators.

For the lane identification transmissions there are provided two discriminators 151 and 152, both of which operate during each one of the half second lane identification transmissions. The discriminator 151 compares the phase of a first fundamental frequency signal obtained by mixing in mixer 153 the received eighth and ninth harmonic signals from the filter units 137 and 138 with the phase of a second fundamental frequency signal obtained by mixing in a mixer 154 the sixth and fifth harmonic signals. Thus during the lane identification transmissions, discriminator 151 compares, at the fundamental frequency, a signal derived from the master transmissions with a signal derived from one of the slaves.

The discriminator 152 compares the phase of two signals at the sixth harmonic frequency. One of these signals is the sixth harmonic received directly from the master station and the other is derived from the slave transmissions by mixing in a mixer 155 the outputs of the frequency multipliers 145 and 146. Since the discriminator 152 compares signals from the same stations as does the discriminator 151 but makes the comparison at a frequency six times as great, a phase measuring indicator 156 operated by the discriminator 152 measures six complete cycles of phase change for every cycle measured by a phase indicator 157 operated by the discriminator 151.

Phase indicators 156 and 157 are mounted within a single housing 158, and, as explained below, are arranged with their pointers concentrically disposed to traverse the same set of scales. Phase indicator 157, instead of being provided with a single pointer to traverse a circular scale, has a 60° sector indicator 159 (Figure 10) which indicates a sector extending over 60° of three concentric scales 162, 163 and 164. The second phase meter 156 in the same housing 158 is geared down in the ratio of six to one, and is provided with six pointers 165 fixed on the reduced speed shaft and angularly spaced apart, the separation between each of the pointers being 60°. These two pointers 159 and 165 have a common center and operate over the same scales. It will be appreciated that the sixth harmonic indicator will give a more accurate position indication than the fundamental frequency indicator since it operates on a higher frequency. There will, however, be more ambiguities in the position determination at the sixth harmonic, since any one phase determination at the sixth harmonic could correspond to six different phase readings at the fundamental frequency. By gearing down the sixth harmonic indicator and providing it with six pointers 165 as described above, these six possible positions will be indicated by the six pointers. The 60° sector indicated by the indicator 159 will contain one of the pointers 165, and thus identifies which of the six pointers is to be used. If there were no errors in either indication, one of the pointers 165 would lie exactly in the center of the sector 159. Various errors may arise, for example due to the reception of sky wave signals. The reading therefore is taken from one of the pointers 165 which gives the more accurate indication, and the sector indicator 159, is used for identifying which of the pointers 165 is to be read. It will thus be seen that the combined indicator enables the accuracy of the sixth harmonic comparison to be maintained, whilst taking advantage of the coarseness and consequent minimum of ambiguity of the fundamental frequency phase comparison.

The fundamental frequency and sixth harmonic discriminators 157, 156 have to operate during the short period of the half second lane identification transmissions. The indicators therefore are arranged for fast action and are provided with holding circuits in the manner described below. The normal pattern indicators 139—141, on the other hand, operate continuously during the normal transmissions and are made slow-acting and continuous in order to avoid any momentary disturbance during the lane identification transmissions.

Figures 10, 11, 12:
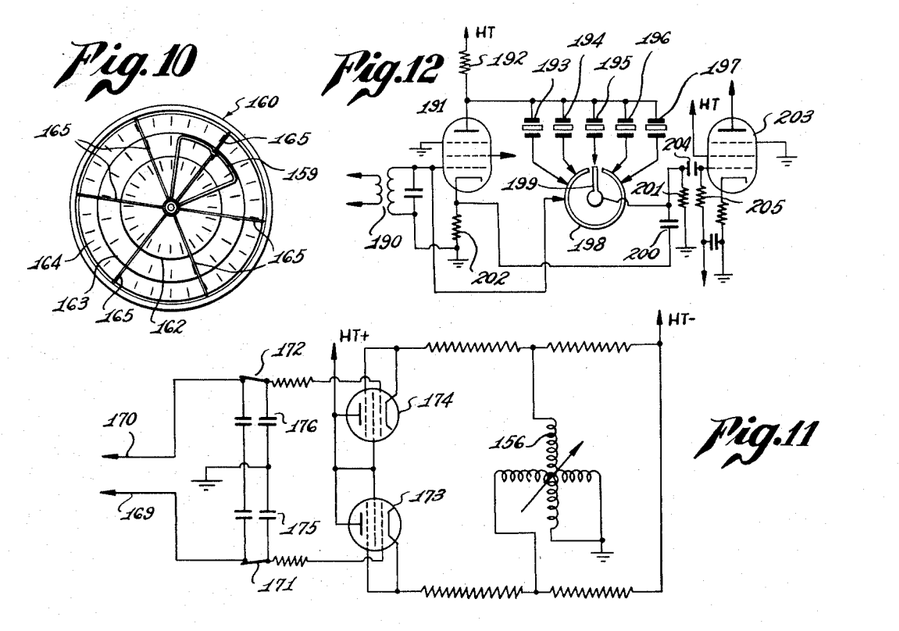
Figure 10 is a front view of a phase meter constructed and arranged particularly for use as a lane identification meter.
Figure 11 is a wiring diagram illustrating the construction of the holding circuits used to control the operation of the lane identification phase meters.
Figure 12 is a circuit diagram illustrating one form of crystal acceptor-rejector circuits used in the receiving apparatus shown in Figure 9.

The reading obtained from the lane identification transmissions are used for setting or for checking the setting of lane registering mechanisms (not shown) operated by the phase indications 139—141. Thus conveniently the indications provided by each of the three lane identification transmissions are shown on the same indicator 160. This indicator is therefore provided with the three scales 162, 163 and 164 suitably calibrated with reference to the red, green, and purple patterns, the appropriate scale being illuminated during the period that each indication is held on the sector, which period may conveniently be about five seconds.

The timed switching for the illuminating of the scales and for operating the holding circuits is controlled by the one twenty-fifth of a second signals from the master station which are accepted by one of the channels of each of two additional band acceptor crystal filter circuits 166 and 167 (Figure 9) which are tuned respectively to the sixth harmonic plus 60 cycles and to the sixth harmonic minus 60 cycles.

The signals accepted and passed by the filters 166 and 167 are applied to a relay and timer apparatus indicated generally by the rectangle 168 and comprising equipment similar to that shown and described with reference to Figure 3 at 75—78. These time controlled relays are arranged, as described in connection with Figure 3, to illuminate the appropriate scale 162, 163, or 164 during the red, green, and purple lane identification transmissions and for a period thereafter for a total time of about five seconds each. These relays also function to connect the phase meters 156 and 157 to their discriminators 152 and 151 during the identification transmissions and to effect a holding of the indication for a considerable period after the identification transmissions have ceased for a total of about five seconds.

Figure 11 illustrates the switching and holding circuits for the phase meter 156, it being understood that a like arrangement is used for phase meter 157. It will be understood that the discriminator 152 operates to produce between one output conductor 169 and ground a direct potential representative of the sine of the measured phase angle, and to produce between another output conductor 170 and ground a direct potential representative of the cosine of that angle.

When contacts 171 and 172 of the 0.4 second timed relay are closed, conductor 169 is connected to the grid of a cathode follower tube 173 and conductor 170 is connected to the grid of a second cathode follower tube 174. Provided the relay contacts are held closed for a sufficient time to charge holding condensers 175 and 176 to the potentials of the conductors 169 and 170, then the opening of the relay contacts 0.4 seconds later will leave the condensers charged to their correct phase indicating voltages. The phase indicating meter 156 is connected in the output circuits of the cathode follower tubes 173 and 174 and will maintain the correct reading corresponding to the determined phase angle, for a considerable time provided due care has been given to ensure that no grid current flows in the tubes 173 and 174 and that the leakage of condensers 175 and 176 is kept small. To ensure that the measured phase difference is indicated correctly, the input signals have to be of sufficient duration to charge fully the condensers 175 and 176 and also the relay contacts 171 and 172 have to be closed for a period which does not exceed or overlap the period of lane identification transmission. It is for this reason that the relay is timed at 0.4 seconds when lane identification transmissions of 0.5 seconds duration are used.

The holding circuits for the phase indicators at the transmitting stations may be constructed in a similar manner.

To generate reference signals in a fixed multiple phase relation for checking and adjusting the receiver, there is provided a further amplifier 175 (Figure 9) tuned to the sixth harmonic i. e. the master frequency. The output of the amplifier 175 is passed through another acceptor-rejector crystal filter circuit 176 to select the signals from one chain only and thence to a frequency divider 177. This divider provides an output signal at the fundamental frequency which is applied to a pipper 178 which produces output signals comprising short impulses recurring at the fundamental frequency. Such impulses contain a series of harmonics of the fundamental frequency in a fixed multiple phase relation. Provided the impulses are very short, the various harmonics are of substantially equal amplitude.

A switch 179 is arranged for connecting the antenna 130 either to the amplifiers 131—134 or to the amplifier 175. Further switch contacts 180 are arranged so that when the antenna is connected to the amplifier 175, the output of the pipper 178 is applied to the amplifiers 131—134. This output provides reference signals in fixed multiple phase relation which is the standard or zero indication for all the phase indicators. These indicators are all zeroed mechanically and thus no phase adjusters are required in the amplifiers.

It will be noted that since the input to the pipper 178 is derived from the received master signal, the reference signals produced by it will be exactly equal in frequency to all the radiated signals. Furthermore, the pipper 178 will produce reference signals of the exact frequencies for any of the chains which may be selected by switching of the acceptor-rejector crystal filter circuits.

Figure 13:
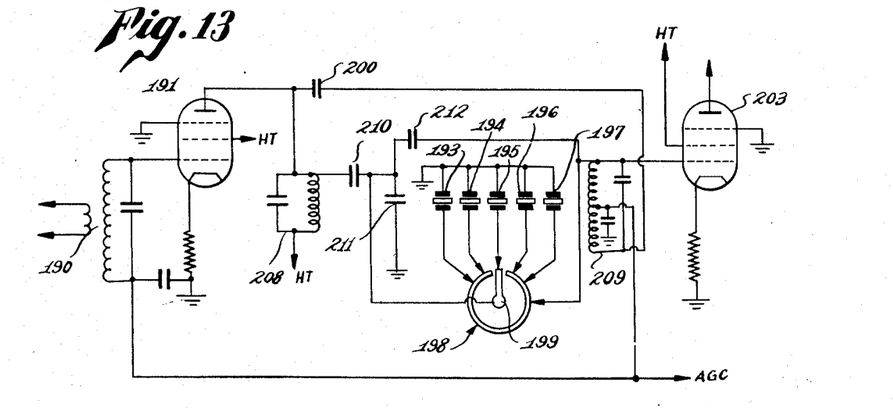
Figure 13 is a wiring diagram illustrating a modified form of crystal acceptor-rejector circuit.

The construction and arrangement of the crystal acceptor-rejector circuits 135—138, 166, 167 and 176 is illustrated in Figures 12 and 13, it being understood that these circuits differ from each other only in the frequencies accepted or rejected. It will also be understood that these units are included in the mobile receivers to permit selection of the appropriate transmitting chain. The term chain is used to refer to a master transmitter and three slave transmitters all operating at harmonics of the same fundamental frequency. The acceptor-rejector circuits now to be described provide such extreme selectivity as to permit the use of five separate chains operating on five slightly different fundamental frequencies and independently of each other without going outside of the allowed bandwidths of a single set of frequency allocations.

In the circuit shown in Figure 12, the input signal from the tank circuit 190 is applied to the input grid of an amplifier tube 191. The anode of the tube 191 is connected to a 1500 ohm load resistor 192 and to one side of crystals 193, 194, 195, 196 and 197. It will be understood that any references to specific component values are merely by way of example in order that the invention may be more clearly understood. The second terminals of the crystals are connected to a switch 198. The single contact wiper 199 of the switch connects the acceptor crystal (195 in the switch position shown) to a neutralizing condenser 200 and to a 16,000 ohm load resistor 201. The second terminal of the neutralizing condenser 200 is connected to the cathode of the tube 191. This cathode has a signal voltage which is in phase opposition to that at the anode of the tube because of the un-bypassed cathode resistor 202. The signal appearing across the resistor 201 is applied to a following tube 203 by means of a conventional condenser 204 and grid leak 205 circuit and the A. G. C. voltage is applied to the grid through the grid leak 205 in the usual manner. The switch 199 includes a ring wiper 206 which is connected mechanically to wiper 199 so as to be moved therewith. Wiper 206 connects the rejector crystals (193, 194, 196 and 197 in the switch position shown) to the grid of the tube 191. Each of the rejector crystals being connected between the anode and grid of the tube 191 causes an input load to be applied which is effectively lower in resistance than the resistance of the crystal at its resonant frequency due to the fact that the anode supplies a signal which is in phase opposition to the signal at the grid.

The circuit shown in Figure 13 provides a higher gain than that just described. This circuit is in many respects similar to that shown in Figure 12 and like reference numerals have been used to indicate corresponding components. The larger gain of this circuit is mainly due to a high anode impedance for the tube 191 provided by a tank circuit 208. This anode tank or primary circuit is capacity coupled to a tapped tank circuit 209 which feeds the tube 203. The capacity coupling is provided by a conventional three capacity star arrangement comprising the condensers 210, 211 and 212. The capacity coupling so provided is neutralized by the condenser 200 and thus at all frequencies at which the crystals are equivalent to their electrostatic capacity, the secondary output is nil. At the pass frequency of the acceptor crystal (195 in the switch position shown), the capacity 211 is effectively short-circuited by the acceptor crystal and the coupling between the primary circuit 208 and the secondary circuit 209 is wholly dependent on the value of the condenser 200. By a proper choice of the capacities of the condensers 210, 211 and 212, the neutralizing value may be made to correspond to the optimum coupling value and thus there is provided a stage gain equal to that of a non-crystal stage. The rejector crystals (193, 194, 196 and 197 in the switch position shown) are connected from the grid of valve 203 to ground and thus at the rejector frequencies the impedance from grid to ground is substantially reduced.

From the foregoing it will be observed that this invention provides a practical and commercially feasible solution to all of the problems hereinbefore mentioned and provides for a navigation system having attributes heretofore considered a practical impossibility; i. e., extremely high accuracy combined with little or no ambiguity. Attention is directed to the fact that all operations and controls are achieved and function automatically. This reduces to a minimum the operating staff required while insuring reliable and continuous service, and also substantially eliminates any special training of users of the system—anyone who can read a meter and plot the readings on the chart is qualified as a receiver operator.

While the preferred embodiments of the invention have been shown and described, the invention is not to be limited to the illustrated details of construction except as defined in the appended claims.

We claim:

1. A phase controlling circuit for adjusting the phase of an output signal relative to an input signal comprising an electronic valve circuit for producing from the input signal first and second signals differing from phase opposition by a small angle and for combining the first and second signals so as to produce a third signal of which the amplitude and phase angle will vary in accordance with the relative amplitudes of said first and second signals, a tuned circuit to which said third signal is applied and means for simultaneously varying the resonant frequency of the tuned circuit and the relative amplitudes of the first and second signals arranged so that the variation in phase of said third signal is substantially equal to the variation in phase effected by the change in resonant frequency of the tuned circuit and so that the tuned circuit is in resonance at the frequency of the input signal when the rectors representative of said first and second signals form a right triangle.

2. A phase controlling circuit according to claim 1 wherein said electronic valve circuit comprises a pair of thermionic amplifier valves having their outputs connected in parallel, means for applying to their respective input grids signals derived from said input signal and differing from phase opposition by a small angle and means for applying a control voltage to an electrode of at least one of the valves so as to control the relative gain of the two valves.

3. Apparatus for controlling the phase of a signal radiated by a radio transmitter in accordance with the phase of an input signal comprising a phase controlling circuit according to claim 1 arranged to vary the phase of an output signal with respect to said input signal in response to an applied control voltage, an amplifier coupled to a radiator for amplifying and radiating said output signal means for receiving the radiated signal, a phase discriminator arranged to produce a control voltage in accordance with the phase relation between the received signal and said input signal and means for applying said control voltage to the phase controlling circuit to adjust the phase of the output signal relative to the input signal in a direction to correct any change from the desired phase relation between the radiated signal and the input signal determined by the phase discriminator.

4. A radio navigation system comprising a master transmitter arranged to radiate two signals of different but harmonically related frequencies in a fixed multiple phase relation, the frequencies being such that the signals can be combined in a receiver to produce a signal of lower frequency than either of the radiated frequencies and one or more slave transmitters spaced from the master transmitter, each slave transmitter comprising means for receiving the master signals, frequency changing means including a frequency divider for converting a signal maintained in synchronism with some of the received signals into a signal of a frequency different from but harmonically related to the frequencies of the master signals, means for combining the two received master signals to produce a signal of lower frequency than the radiated master signals and means for synchronizing the frequency divider of the frequency changing means with said lower frequency signal.

5. A radio navigation system according to claim 4 wherein the master transmitter is arranged to radiate two signals having a frequency difference equal to the fundamental frequency (of which all the radiated frequencies are harmonics) and wherein the frequency changing means at the slave transmitter or transmitters includes a frequency divider arranged to divide one of the received master signals to the fundamental frequency and means for synchronizing the frequency divider with a fundamental frequency signal derived from the two received master signals.

6. A radio navigational system according to claim 5 wherein the slave transmitter or transmitters are each arranged to radiate two signals having a frequency difference equal to the fundamental frequency.

7. A radio navigation system according to claim 4 wherein the frequency divider is arranged to divide the frequency of an uninterrupted signal maintained in synchronism with one of the received master signals and is synchronized with a lower frequency signal derived from intermittent radiations from the master station.

8. A radio navigation system according to claim 7 wherein there is provided circuit means for applying both said lower frequency signal and the uninterrupted signal of higher frequency to the input of the frequency divider and means responsive to the lower frequency signal for reducing the amplitude of the higher frequency signal input to the divider during the periods of the intermittent radiation from the master station.

9. A radio navigation system in which unmodulated radio signals are radiated by fixed transmitting apparatus to provide a succession of positional indications at a mobile receiver wherein the transmitting apparatus is provided with means for shifting the frequency of a radiation from one of the transmitters to signal the successive transmissions to the receiver, and to the other transmitters and wherein the receiving apparatus is provided with means responsive to such altered frequency signals for controlling the operation of position indicating apparatus operated by the received radiations.

10. A radio navigation system according to claim 9 and comprising a master transmitter and at least two spaced slave transmitters arranged to radiate signals in a fixed phase relationship whereby at a mobile receiver positional indications may be obtained by comparing the phase of signals received from the master station with signals received from each of the slave transmitters wherein the slave transmitters are arranged to radiate in sequence and the signals from the master transmitter are periodically altered in frequency to control the successive operations of the slave transmitters and to control the indicating apparatus of the mobile receiver.

11. A radio navigation system according to claim 9 wherein a mobile receiver is provided with a phase angle indicator responsive to each of the successive transmissions and having a pointer arranged to traverse a plurality of scales corresponding respectively to the various transmissions and where means responsive to altered frequency control signals received from the master station are arranged to indicate the appropriate scale corresponding to each of the transmissions.

12. A radio navigational receiving apparatus for comparing the phase of radio signals of different but harmonically related frequencies wherein there is provided a reference signal generator for producing signals of the different frequencies in a fixed multiple phase relation comprising a receiver for receiving one of the radio signals and a distortion generator arranged to be excited by a signal derived from the received signal so as to produce said signals of the different frequencies in a fixed multiple phase relation.

13. A radio navigational receiving apparatus according to claim 12 wherein said receiver is arranged to receive a signal the frequency of which is a multiple of the fundamental of the different frequencies and a frequency divider circuit is coupled between the receiver and the distortion generator to excite the latter at the fundamental frequency.

14. Receiving apparatus for a radio navigational system of the kind in which a phase comparison is made between synchronized signals radiated by spaced transmitting stations comprising a fine phase comparison means for comparing the phase of signals from two stations at a first frequency to provide a fine positional determination, a coarse phase comparison means for comparing the phase of signals from the same two stations at a second frequency to provide a coarse positional determination, and an indicator having two rotatable indicating elements driven respectively by said first and second phase comparison means and arranged to traverse a common circular scale, the indicating element driven by said coarse phase comparison means comprising a single indicating arm arranged to make one complete revolution for each cycle of measured phase change, and the indicating element driven by said fine phase comparison means comprising a number of indicator arms uniformly spaced angularly about the axis of rotation, the number of arms being equal to the ratio of the changes of phase measured by said fine and coarse phase comparison means.

15. Receiving apparatus according to claim 14 wherein the indicating element driven by said coarse phase comparison means is arranged to indicate a sector extending over an angle equal to the spacing between adjacent arms of the other indicating element.

16. A radio navigational system comprising: spaced master and slave transmitters for radiating signals of different but harmonically related frequencies, said master transmitter including means for radiating a stable frequency master signal, and said slave transmitter including a frequency stable slave oscillator and means coupling said oscillator to an antenna to provide a radiated slave signal; means at the slave transmitter for receiving the master signal; and means operative on said slave oscillator for maintaining a fixed phase relation between the radiated master and slave signals, the slave oscillator being of sufficient stability to maintain said fixed phase relation during periods when the reception of the master signal at the slave transmitter is momentarily interrupted.

17. A radio navigational system according to claim 16 wherein the master transmitter comprises a crystal-controlled master oscillator, amplifying and transmitting means coupled to the master oscillator to provide a radiated master signal, and means for maintaining a fixed phase relation between the radiated master signal and the master oscillator output.

18. A radio navigational system according to claim 16 wherein the slave oscillator comprises a crystal-controlled oscillator, and wherein the slave transmitter includes means for maintaining a fixed phase relation between the output of the slave oscillator and the received master signal, and means for maintaining a fixed phase relation between the radiated slave signal and the output of the slave oscillator.

19. A radio navigational system according to claim 16 wherein means are provided at the master transmitter for periodically altering the frequency of the master signals for short intervals of time, and wherein means are provided at the slave transmitter responsive to alteration of the frequency of the master signal to intermittently operate the slave transmitter.

20. A radio navigational system according to claim 19 which includes a second and third slave transmitter, wherein each of said three slave transmitters are controlled by said master transmitter, wherein each of the slave transmitters includes means responsive to a distinctive control signal of altered frequency from the master transmitter for interrupting the radiation from that slave transmitter, and wherein said first-mentioned slave transmitter includes means for then radiating from that slave transmitter two signals of the same frequencies as those radiated from said second and third slave transmitters, said two signals being in a fixed multiple phase relation.

21. A radio navigational system comprising: a plurality of spaced fixed transmitters for sequentially radiating transmissions providing a number of positional indications at a mobile receiver; means at one of said transmitters for radiating control signals at the commencement of each transmission; holding means at said receiver operable to maintain said indications for periods longer than the duration of the corresponding transmissions; and means responsive to reception of said control signals for initiating operation of said holding means.

22. A radio navigational system according to claim 21 wherein each transmission comprises synchronized signals radiated from two of said transmitters so that a positional indication is provided at said receiver by a comparison of the phase of the received signals, and said sequentially radiated transmissions constituting similar transmissions radiated sequentially from different pairs of said transmitters.

23. A radio navigational system according to claim 22 wherein said receiver is for use on a vehicle and comprises a phase discriminator for producing at least one voltage corresponding to the phase angle between the received signals, a relay operable by said control signals to connect a condenser to said phase discriminator for a period slightly shorter than the period of reception of said transmissions so that the condenser is charged to said voltage, and indicator means coupled to said condenser to indicate the charge applied thereto.

24. A radio navigational system according to claim 21 wherein a single indicator means is provided to thereby indicate successively the positional information provided by said sequentially radiated transmissions, said holding means being operable to maintain each indication of said indicator means for a period longer than the duration of the corresponding transmission and less than the interval between successive transmissions.

References Cited in the file of this patent

UNITED STATES PATENTS

| Number | Name | Date |
|---|---|---|
| 1,792,276 | Chubb | Feb. 10, 1931 |
| 1,851,091 | Fetter | Mar. 29, 1932 |
| 2,379,363 | Lear | June 26, 1945 |
| 2,439,890 | Hings | Apr. 20, 1948 |
| 2,462,764 | O'Brien | Feb. 22, 1949 |
| 2,513,315 | Hawkins | July 4, 1950 |

FOREIGN PATENTS

| Number | Country | Date |
|---|---|---|
| 347,638 | Great Britain | Apr. 29, 1931 |
| 120,663 | Sweden | Jan. 20, 1948 |